(12) United States Patent
Whipple et al.

(10) Patent No.: US 10,048,041 B1
(45) Date of Patent: Aug. 14, 2018

(54) METHOD AND SYSTEM FOR PROTECTING ARMOR FROM ENVIRONMENTAL EXPOSURE

(71) Applicant: Robertson Fuel Systems, L.L.C., Tempe, AZ (US)

(72) Inventors: Matthew Whipple, Tempe, AZ (US); Kate Hocking, Tempe, AZ (US); Ruben Lopez, Tempe, AZ (US)

(73) Assignee: ROBERTSON FUEL SYSTEMS, L.L.C., Tempe, AZ (US)

( * ) Notice: Subject to any disclaimer, the term of this patent is extended or adjusted under 35 U.S.C. 154(b) by 0 days.

(21) Appl. No.: 15/213,311

(22) Filed: Jul. 18, 2016

Related U.S. Application Data (60) Provisional application No. 62/194,070, filed on Jul. 17, 2015.

(51) Int. Cl.
| | | |
|---|---|---|
| *F41H 1/02* | (2006.01) | |
| *B32B 7/12* | (2006.01) | |
| *B32B 37/14* | (2006.01) | |
| *C09J 175/04* | (2006.01) | |

(52) U.S. Cl.
CPC .............. *F41H 1/02* (2013.01); *B32B 7/12* (2013.01); *B32B 37/14* (2013.01); *C09J 175/04* (2013.01); *B32B 2255/26* (2013.01); *B32B 2305/72* (2013.01); *B32B 2571/02* (2013.01)

(58) Field of Classification Search
CPC .............. F41H 1/02; B32B 7/12; B32B 37/14
See application file for complete search history.

(56) References Cited

U.S. PATENT DOCUMENTS

| | | | |
|---|---|---|---|
| 2005/0255776 A1* | 11/2005 | Howland | .................. B32B 5/26 442/286 |
| 2010/0005556 A1 | 1/2010 | Pittman et al. | |

\* cited by examiner

*Primary Examiner* — Daniel H Lee
(74) *Attorney, Agent, or Firm* — Smith Tempel; Steven P. Wigmore

(57) ABSTRACT

A method for making hydrocarbon and water resistant armor composite may include applying an adhesive layer to upper and lower surfaces of a stack of armor materials. In one embodiment, a first sheet and a second sheet of porous materials may be provided. A protective environmental coating may be applied to the sheets of porous materials. In another embodiment, an adhesive layer may be applied to upper and lower surfaces of a stack of armor materials and then providing a first sheet and a second sheet of nonporous materials. The protective environmental coating as well as the first and second sheets of nonporous materials may make the hydrocarbon and water resistant armor impervious to at least fuel, oil, air, or water. The hydrocarbon and water resistant armor may form part of ballistic apparel, a blast blanket, a ballistic panel, or a fragmentation panel.

20 Claims, 7 Drawing Sheets

METHOD AND SYSTEM FOR PROTECTING ARMOR FROM ENVIRONMENTAL EXPOSURE

DESCRIPTION OF THE RELATED ART

With increased environmental testing being requested of armor material manufacturers, more specifically soaking armor in fuel, it is difficult to those which are typically made with aramid composites to meet these demands. Protecting aramid composites with other materials without compromising the flexibility of the aramid composites while maintaining high standards of performance after exposure to various fluids, such as water, oil, and fuel can be challenging. What has been invented are methods for integrating protective coatings that adhere to the outer surface of aramid composites while also encapsulating the perimeter of loose aramid layers enabling resistance to hydrocarbons and water.

One conventional technology that provides some environmental protection to ballistic armor is coating or treating individual layers of aramid or fibers to provide resistance to fuels, oils and water. This method, while effective for fuel resistance, adds weight to the armor inserts, reduces flexibility of those inserts, and limits the movement of fibers in response to impacts and penetrations, which attributes may reduce the degree of protection provided or are otherwise undesirable attributes for human body armor.

Another technology may include vacuum sealing methods where a protective layer is sealed around aramid panels that are used in ballistic apparel. Encapsulating the panels with a protective layer using conventional methods has limitations. With vacuum sealing the protective coating, a small amount of air may remain intentionally or become trapped or captured unintentionally within the sealed aramid panel. The trapped air pockets or bubbles may expand or contract in response to changes in temperature or altitude, which may result in dimensional instability.

Removing all of the air through a vacuum process, while substantially eliminating the dimensional changes just outlined, usually reduces flexibility and degrades the intended ballistic or blast performance provided by the loose aramid panels and is therefore undesirable.

Another drawback of aramid panels sealed loosely within a protective covering is their ability to withstand resistance to these environmental conditions following normal use. Abrasion resistance decreases when the protective coating is not integrated to the aramid panel. This can occur when panels are inserted or removed from vests and get snagged, thus exposing the aramid fibers below that the protective coating was intended to protect against.

What is needed in the art are a method and system for making armor composite structures that are resistant to fluids, specifically hydrocarbons and water, with minimal weight gain or loss of flexibility compared to unprotected aramid and other materials, with dimensional stability and the ability to withstand minor abrasions and impacts without loss of fluidic resistance.

SUMMARY OF THE DISCLOSURE

A method for making a hydrocarbon and water resistant armor composite may include applying an adhesive layer to upper and lower surfaces of a stack of armor materials. Next, a first sheet and a second sheet of porous materials may be provided, with the first sheet of porous material and the second sheet of porous material each having an area greater than the area of the stack of armor materials.

An adhesive layer may be applied to the first sheet of porous material and be placed on the adhesive layer of a first side of the stack of armor materials while an adhesive layer may be applied to the second sheet of porous material and be placed on the adhesive layer of a second side of the stack of armor materials.

Heat and vacuum may then be applied to the adhesive layer, first and second sheets of porous materials, and the stack of armor materials such that the porous materials and adhesives are cured to the armor materials. Next, a protective environmental coating may be applied to the sheets of porous materials. The protective environmental coating may then be cured to the sheets of porous materials.

The armor material may comprise an aramid material or polyethylene, polypropylene or spider silk while the sheets of porous material comprise a fabric made from at least one of nylon, polyester, polypropylene, polyethylene or an aramid. The adhesive layer may comprise a polyurethane or polymer cement layer while the protective environmental coating may comprise a solvated elastomer from at least one of fluorinated, hydrogenated, or chlorinated.

Another method for making a hydrocarbon and water resistant armor composite may include applying an adhesive layer to upper and lower surfaces of a stack of armor materials and then providing a first sheet and a second sheet of fuel and water resistant nonporous materials, the first sheet of nonporous material and the second sheet of nonporous material each having an area greater than an area of the stack of armor materials.

Next, an adhesive layer may be applied to the first sheet of the nonporous material may be placed on the adhesive layer of a first side of the stack of armor materials while an adhesive layer may be applied to the second sheet of the nonporous material is placed on the adhesive layer of a second side of the stack of armor materials. Heat and vacuum may then be applied to the adhesive layer, first and second sheets of nonporous materials, and the stack of armor materials such that the nonporous materials and adhesives are cured to the armor materials.

The protective environmental coating as well as the first and second sheets of fuel and water resistant nonporous materials make the armor impervious to at least fuel, oil, air, and water. The hydrocarbon and water resistant armor may form part of ballistic apparel, a blast blanket, a ballistic panel, or a fragmentation panel.

This summary is provided to introduce a selection of concepts that are further described below in the detailed description. This summary is not intended to identify key or essential features of the claimed subject matter, nor is it intended to be used as an aid in limiting the scope of the claimed subject matter

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

Figure 1A:
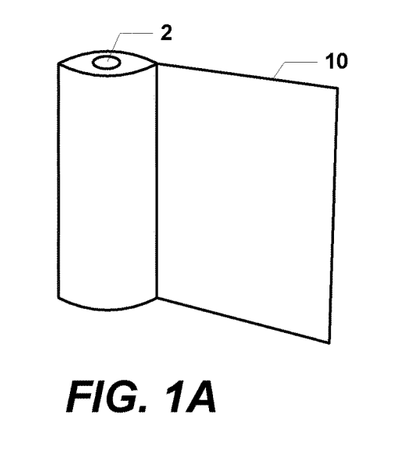
FIG. 1A illustrates a roll armor material.

Referring now to the figures, FIG. 1A illustrates a roll 2 of armor material 10. The armor material 10 may comprise an aramid material, polyethylene, polypropylene or spider silk, and/or any combination thereof. The aramid material may comprise aromatic polyamides and it may include fibers in which the chain molecules are highly oriented along the fiber axis, so the strength of chemical bonds can be exploited.

Specifically, the armor material may comprise an aramid blast-resistant material, such as, but not limited to, material MC8-8542B, manufactured by TexTech Industries in Maine. The armor material 10 may be used as the base material for forming various different products, such as, but not limited to, ballistic apparel such as human body armor like bulletproof vests, blast blankets, and standalone ballistic and fragmentation panels.

Other products are feasible and are well within the scope of this disclosure as understood by one of ordinary skill in the art. The armor material 10 may have a thickness between about 0.10 of an inch to about 0.50 of an inch, and preferably, between about 0.125 of an inch to about 0.250 of an inch. However, other thicknesses for the armor material 10 are possible and are well within the scope of this written disclosure as understood by one of ordinary skill in the art.

Figure 1B:
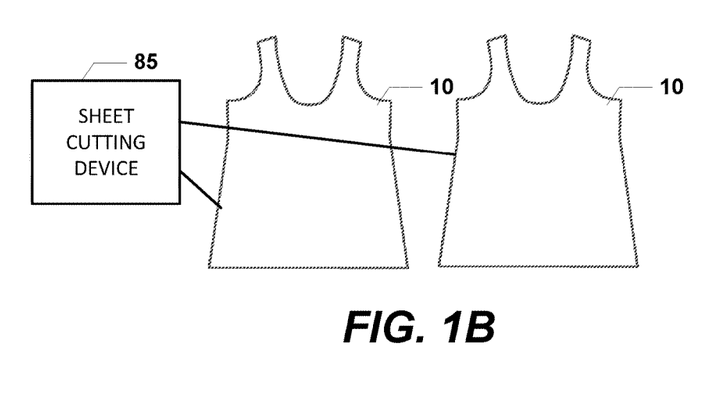
FIG. 1B illustrates exemplary embodiments of sheets of armor material that have been cut into desired shapes.

FIG. 1B illustrates exemplary embodiments of sheets (or singular—a sheet) of armor material 10 that have been cut into desired shapes. A sheet cutting device 85 may used to cut the sheet of material that is taken off the roll 2 as illustrated in FIG. 1A. The sheet cutting device 85 may comprise an automated machine or one that is operated by a human. The sheet cutting device 85 may include electric shears and/or other types of cutting devices 85 as understood by one of ordinary skill in the art.

Other types of sheet cutting devices 85 include, but are not limited to, hand operated scissors; power knifes, such as, but not limited to, a straight knife, a band knife, a round knife, die cutting knifes, and a notcher knife. Automated techniques for cutting the armor material 10 may include, but are not limited to, a computer-controlled knife cutter, a computer-controlled laser beam cutter, a water jet cutting device, and a plasma torch cutting device.

As illustrated in FIG. 1B, the armor material 10 has been cut by a sheet cutting device 85 into a desired shape that could be used in human body armor type applications. The geometry illustrated for the cut armor material in FIG. 1B is that of a vest that could be worn on the human body. The sheet cutting device 85 may easily cut the armor material 10 into other desired shapes besides vests (not illustrated), such as, but not limited to, basic geometrical shapes such as rectangular, square, etc. for vehicle shielding type applications as well as blast blanket type applications.

Figure 1C:
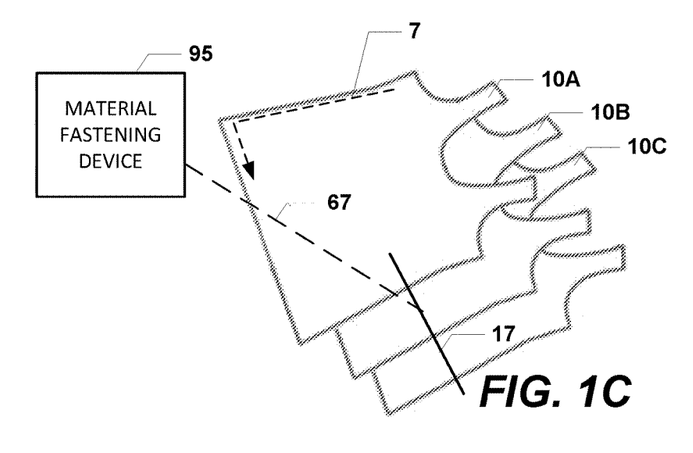
FIG. 1C illustrates sheets of armor material that have been fastened together to form a stack of armor material.

Referring now to FIG. 1C, this figure illustrates sheets of armor material 10A, 10B, 10C that have been fastened together with a material fastening device 95 to form a stack of armor materials 10A-10C. The material fastening device 95 may comprise a machine such as a sewing machine that punches threads 17 through the armor material 10 with one or more needles 67 (represented with a dashed line).

However, other types of material fastening devices 95 may be employed without departing from the scope of this written disclosure as understood by one of ordinary skill in the art. Other types of material fastening devices 95 may include, but are not limited to, sonic welding devices, adhesive applicator devices, and other similar fastening devices 95.

Once the three sheets 10A-10C are aligned with one another such that the stack of sheets 10A-10C appears to be a single sheet, the fastening device 95 may fasten the sheets 10A-10C together along their geometrical perimeter or outline with stitched threads 17 as illustrated by dashed line 7. Once the three sheets 10A-10C are fastened together, they may appear to look like a single sheet from a frontal view as understood by one of ordinary skill in the art.

While three sheets 10A-10C are illustrated in FIG. 1C, a fewer number or a greater number of armor sheets 10 may be employed without departing from this disclosure as understood by one of ordinary skill in the art. A single or a plurality of sheets 10 may be used and is described in further detail below.

Figure 1D:
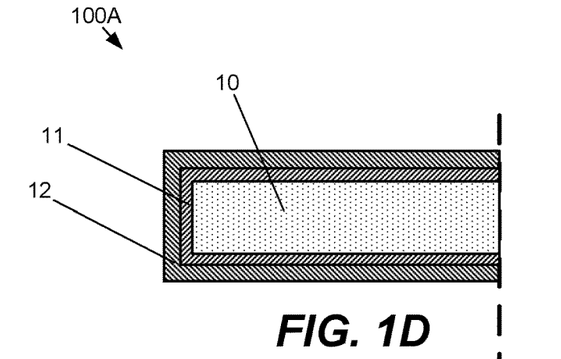
FIG. 1D is one exemplary embodiment of a cross-sectional view of a hydrocarbon and water resistant armor sheet system/combination that may be used in blast blankets and/or vehicle shielding.

FIG. 1D is one exemplary embodiment of a cross-sectional view of a hydrocarbon and water resistant armor sheet system/combination 100A that may be used in blast blankets and/or vehicle shielding. For this cross-sectional view of FIG. 1D, and the cross-sectional views of materials present in remaining FIGS. 2A, 3A, and 4, it is noted that only relative thicknesses of materials are shown and that these relative thicknesses are not controlling or absolute since the thicknesses of the materials may be adjusted for various end applications of the final products formed.

Further, while voids or gaps are illustrated in these cross-sectional views, it is understood that in actual construction, such voids or gaps may not be present. These cross-sectional views may be characterized as snap-shots/brief views of intermediate steps taken during product formation and may not be what the actual materials may look like once the materials are cured/dried. However, it is possible in some instances that these cross-sectional views do depict/show/illustrate the completed product.

For some embodiments, these cross-sectional views provide knowledge/techniques of how materials are placed and/or positioned prior to the materials becoming cured/hardened and/or cross-linked at a molecular level as understood by one of ordinary skill in the art.

According to this exemplary embodiment illustrated in FIG. 1D, the system 100A may comprise a base of a single sheet of armor material 10, a middle adhesive layer 11, and an external environmental protective coating 12. The adhesive layer 11 may comprise an aramid compatible adhesive that easily adheres to the armor material 10.

The adhesive layer 11 may comprise a polyurethane dispersion layer, such as described in co-pending and commonly owned U.S. patent application Ser. No. 14/821,653, filed on Aug. 7, 2015, entitled, "METHOD AND SYSTEM FOR FORMING A SELF-SEALING VOLUME WITH AN AQUEOUS POLYURETHANE DISPERSION LAYER," the entire contents of which are hereby incorporated by reference.

The polyurethane dispersion layer forming the adhesive layer 11 may comprise an aqueous anionic dispersion of a high molecular weight polyurethane, such as, but not limited to, a molecular weight of about 335,000.00 grams per mole. This means that the adhesive layer 11 which is made of a polyurethane dispersion layer generally comprises high molecular weight polyurethane dispersed or dissolved in a liquid medium, such as, but not limited to, water.

The polyurethane dispersion layer which may form the adhesive layer 11 is designed to dry and become somewhat tacky at room temperature, which is typically about 25.0° C. as understood by one of ordinary skill in the art. Further heating will drive off any water, causing the elastomer to coalesce and develop desired material properties for storing liquids, like fuels.

Other aqueous elastomeric dispersions may be used for the adhesive layer 11. Other aqueous elastomeric dispersions include, but are not limited to, Polychloroprene (Neoprene) latex, Styrene butadiene (SBR) latex, Acrylonitrile butadiene (NBR) latex, Chlorosulfonated polyethylene (Hypalon) latex, Ethylene propylene diene monomer (EPDM) latex, and the like.

A cross-linked elastomeric material may also be used in the adhesive layer 11. Such a material can be made by incorporating a cross-linking polymer, such as a water dispersible polyisocyanate, an organofunctional silane, a polyaziridine or a polycarbodiimide, in the polyurethane dispersion.

The adhesive layer 11 comprising a polyurethane dispersion layer may be applied by brushing, troweling, swabbing, dipping or spraying, or other ways as understood by one of ordinary skill in the art The adhesive layer 11 may have a thickness of between about 0.002 of an inch to about 0.010 of an inch, and preferably a thickness of about 0.004 of an inch. However, other thicknesses are possible and are well within the scope of this written disclosure as understood by one of ordinary skill in the art.

The environmental protective coating 12 may comprise a solvated elastomer. According to one exemplary embodiment, the protective coating 12 may comprise an elastomer sold under the tradename of HPC-3B manufactured by Lord Corporation of North Carolina, USA. Other off-the-shelf elastomer products may be used without departing from the scope of this written disclosure.

Other solvated elastomers that may used for the environmental protective coating, include, but are not limited to Polychloroprene (Neoprene), Styrene butadiene (SBR), Acrylonitrile butadiene (NBR), Chlorosulfonated polyethylene (Hypalon), Ethylene propylene diene monomer (EPDM), Polyvinylidene fluoride (FKM), Polysulfide, Hydrogenated nitrile butyl rubber (HNBR), and the like.

The environmental protective coating 12 may have a thickness of between about 0.001 of an inch to about 0.010 of an inch, and preferably between about 0.004 of an inch to about 0.007 of an inch. However, other thicknesses are possible and are well within the scope of this written disclosure as understood by one of ordinary skill in the art. The environmental protective coating 12 may make the system 100A resistant or impervious to various type of liquids or fluids such as, but not limited to, hydrocarbons, water, air, etc.

The adhesive layer 11 may be applied around all exterior surfaces of the armor material 10 by a brush or it may be sprayed with a liquid sprayer as understood by one of ordinary skill in the art. The adhesive layer 11 is then cured at 180 F for 3 hours under vacuum. After the adhesive layer 11 is cured to the armor material 10, the protective environmental coating 12 may be applied to the dried adhesive layer 11 by brushing, spraying, or dipping as understood by one of ordinary skill in the art. Further details and the precise sequence of steps for manufacturing the sheet system 100A of FIG. 1D will be described in more detail below in connection with the flowchart 500 of FIG. 5.

It is noted that the relative thicknesses of the materials 10, 11, 12 illustrated in FIG. 1D are only approximate and should not limit the scope of the system 100A illustrated. That is, it is recognized that different specific applications for the finished system 100A may require different thicknesses of materials and therefore, the relative thicknesses illustrated in FIG. 1D would need to change or adjust to such alternate end-applications/uses for the system 100A. For example, a blast blanket application for system 100A may have different thicknesses of materials 10, 11, 12 compared to a vehicle shielding application for system 100A as understood by one of ordinary skill the art.

Figure 2A:
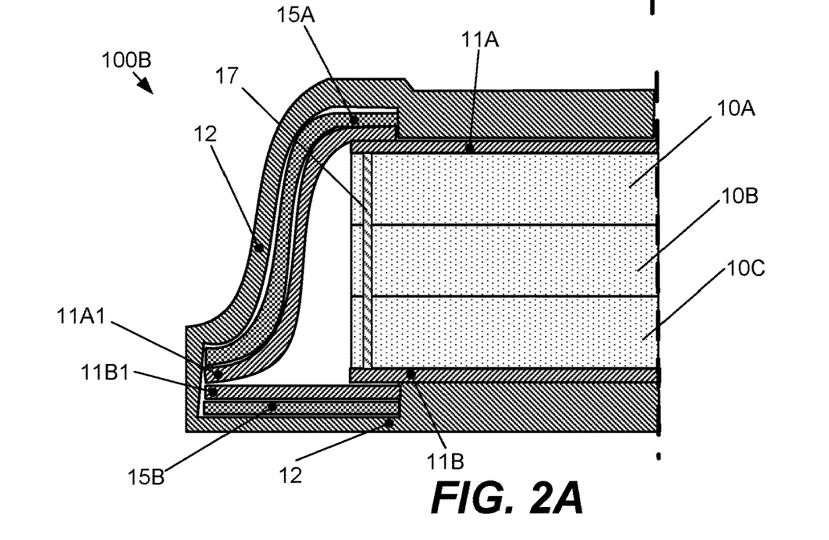
FIG. 2A is one exemplary embodiment of a cross-sectional view of a hydrocarbon and water resistant armor sheet system/combination that may be used in human body armor applications.

FIG. 2A is one exemplary embodiment of a cross-sectional view of a hydrocarbon and water resistant armor sheet system/combination 100B that may be used in human body armor applications. The hydrocarbon and water resistant armor sheet system 100B may comprise stacked layers 10A, 10B, and 10C of the armor material 10. These layers 10A-10C may be fastened together by the material fastening device 95 of FIG. 1C. The layers 10A-10C may be held together by at least one fastener 17 secured by the fastening device 95. The fastener 17 may comprise a stitch as described above in connection with FIG. 1C.

Each layer of armor material 10 may have the preferred thicknesses described above, which means that a structure having three (3) layers would have at least or about three times [3×] the thickness range described above for armor material 10 (which means three-times [3×] the range of about 0.125 of an inch to about 0.250 of an inch which equals about 0.375 to about 0.750 of an inch). In some exemplary embodiments, two layers of armor material 10 or four or more layers of armor material 10 may be employed without departing from the scope of this written disclosure.

Adjacent to the stacked layers of armor material 10A-10C, an adhesive material 11A, 11B may be applied to an exterior surface of a first sheet 10A of the armor material 10 as well as to an exterior surface of a third sheet 10C of the armor material 10. The adhesive layer 11 of FIG. 2A may be applied around all exterior surfaces of the armor material 10 by a brush or it may be sprayed with a liquid sprayer as understood by one of ordinary skill in the art. The adhesive 11 in FIG. 2A is the same as the adhesive 11 described above in connection with FIG. 1D.

As illustrated in FIG. 2A, near an edge section closest to the fastener 17, a picture frame of porous material 15A, 15B may be provided with their own adhesive layers 11A1, 11B1. The porous material 15A, 15B may comprise a fabric made from at least one of nylon, polyester, polypropylene, polyethylene or an aramid and can be woven or non-woven. According to one exemplary embodiment, the porous material may comprise a 3.0 ounce non-woven nylon produced by CEREX Advanced Fabrics, Inc. of Cantonment, Fla. as of this writing. The porous material 15 will usually allow a fluid, like air, or a liquid to pass or penetrate through it as understood by one of ordinary skill in the art.

The porous material 15 may have a fabric aerial density between about 1.0 oz per square yard to about 21.0 oz per square yard, and preferably between 3.0 to about 4.0 oz per square yard with a thickness of about 0.015". However, other aerial densities are possible and are well within the scope of this written disclosure as understood by one of ordinary skill in the art.

Figure 2B:
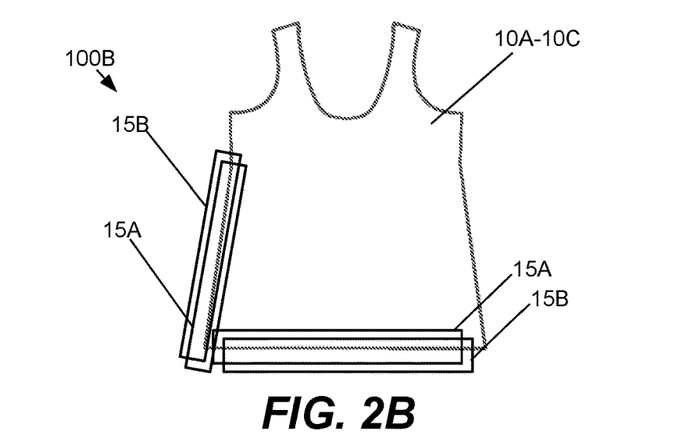
FIG. 2B is top view of the embodiment illustrated in FIG. 2A and illustrates only a portion of the geometrical perimeter of the stacked armor materials that have been provided with picture frame of a porous material.

Referring now to FIG. 2B, this figure illustrates how a picture frame pattern of porous material 15A, 15B of FIG. 2A may be positioned around the geometrical perimeter of the stacked layers of armor material 10A-10C.

While the stack of armor materials 10A-10C are illustrated with a "vest" shape or geometry, it is understood by one of ordinary skill the art, as described above, that other geometries/shapes may be made with the stack of armor materials 10A-10C without departing from the scope of this written disclosure. For example, instead of a "vest" shape, the stack of armor materials 10A-10C could be cut by the sheet cutting device 85 of FIG. 1B into other geometrical shapes, such as, but not limited to, square, rectangular, circular, elliptical, or any combination thereof for other applications such as vehicle shielding or blast blankets.

For the exemplary embodiment illustrated in FIG. 2B, only a portion of the geometrical perimeter of the stacked materials 10A-10C have been provided with strips of a porous material 15A, 15B. As noted below, the entire geometrical perimeter of the stacked layers of armor material 10A-10C are provided with the strips of porous material 15A, 15B. Further, FIG. 2B only illustrates the strips of porous material 15A, 15B and the stacked layers of armor material 10A-10C. FIG. 2B does not show or illustrate the use of layers 11A, 11B, 11A1, 11B1, or the environmental protective coating 12.

Referring again to FIG. 2A, this figure also illustrates how the environmental protective coating 12 may be applied over the adhesive layers 11A, 11B after the adhesive layers have been cured to their respective layers 15A, 15B, 10A, 10B, 10C. The environmental protective coating 12 of FIG. 2A is the same environmental protective coating 12 of FIG. 1D.

Further, while the term "strip" is used for the porous material 15, this term is used with the intent that the size of a strip will usually be smaller than the entire surface area of the stacked layers of armor material 10A-10C. That is, it is recognized that the size (thickness, length, and width) for each strip of porous material 15 may be increased or decreased relative to the size of the stacked layers of armor material 10A-10C illustrated in FIGS. 2A-2B without departing from the scope of this written disclosure as understood by one of ordinary skill in the art.

As illustrated in FIGS. 2A-2B, the strips of porous material 15 may be used to encapsulate the geometrical perimeter of the stacked layers of armor material 10A-10C. Like FIG. 1D, after the adhesive layer 11 and strips of porous material 15 are cured to the armor material 10, the protective environmental coating 12 may be applied to the dried adhesive layer 11 and exterior of the porous material 15 by brushing, spraying, or dipping as understood by one of ordinary skill in the art. Further details and the precise sequence of steps for manufacturing the sheet system 100B of FIG. 2 will be described in more detail below in connection with the flowchart 600 of FIG. 6.

Figure 3A:
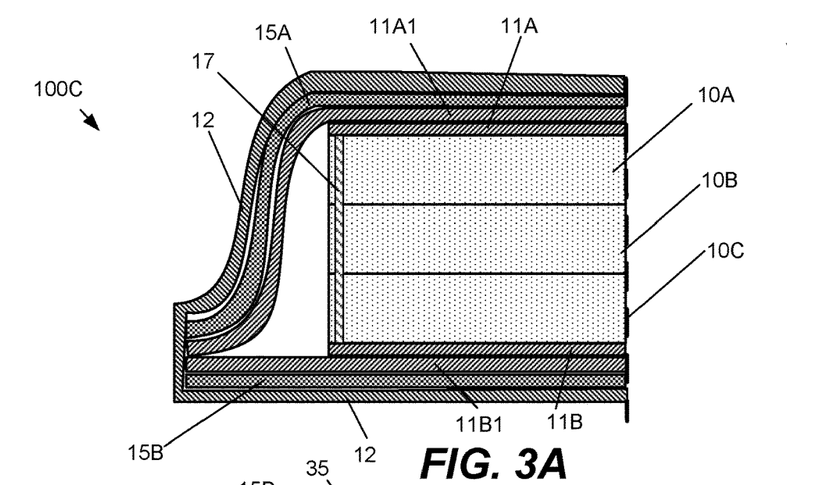
FIG. 3A is another exemplary embodiment of a cross-sectional view of a hydrocarbon and water resistant armor sheet system/combination that may be used in ballistic or blast panels or human body armor applications and which includes an encapsulation manufacturing technique.

FIG. 3A is another exemplary embodiment of a cross-sectional view of a hydrocarbon and water resistant armor sheet system/combination 100C that may be used in human body armor applications and which includes an encapsulation manufacturing technique, similar to that of FIGS. 2A-2B. The cross-sectional view of the hydrocarbon and water resistant armor sheet system/combination 100C of FIG. 3A is very similar to that of FIG. 2A. Therefore, only the differences between these two figures will be described below.

The exemplary embodiment of the sheet system 100C illustrated in FIG. 3A uses the same materials of the armor sheet system 100B of FIG. 2B. One main difference between the exemplary embodiment of FIG. 3A relative to FIG. 2B is that instead of "picture frame strips" of porous material 15 being used, entire "sheets" of porous material 15 (those with a greater surface area than the strips illustrated in FIG. 2B) are now employed in this exemplary embodiment of FIG. 3A.

As noted earlier, the term "strip" for the exemplary embodiment illustrated in FIGS. 2A-2B was being used to denote material that had a surface area which was significantly less than the surface area of the stacked layers of armor material 10A-10C. Meanwhile, the term "sheet" as used in the exemplary embodiment of FIG. 3A is intended to describe a body of porous material 15 that has a surface area which may be equal to and/or greater than the surface area of the stacked layers of armor material 10A-10C.

Figure 3B:
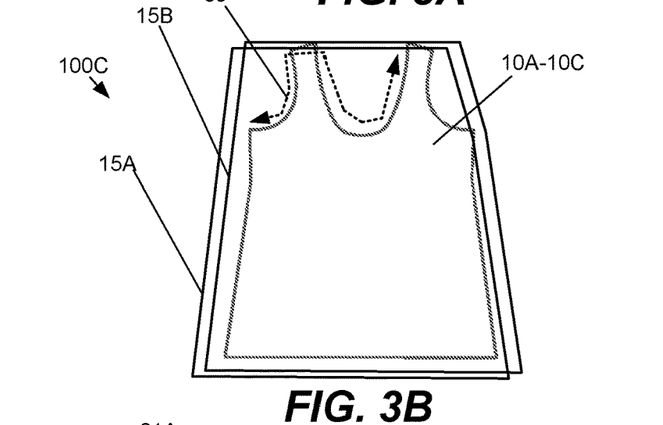
FIG. 3B is at top view for the embodiment of FIG. 3A and which illustrates how sheets of porous material may be used to encapsulate or envelope the entire surface area of the stack layers of armor material.

Referring now to FIG. 3B, this figure illustrates how sheets of porous material 15A, 15B may be used to encapsulate or envelop the entire surface area of the stack layers of armor material 10A-10C. The sheets of porous material 15A, 15B may have a similar or a different geometrical shape relative to the stacked layers of armor material 10A-10C. As noted previously, the stacked layers of armor material 10A-10C may have a "vest" shape or geometry.

Meanwhile, the sheets of porous material 15A, 15B may have a simple geometry, such as, but not limited to, a rectangular shape, a trapezoidal shape, or other like geometries. Further, it is possible for the sheets of porous material 15A, 15B to be cut into identical geometries relative to the stacked layers of armor material 10A-10C.

For example, the sheet cutting device 85 FIG. 1B may be employed to cut the sheets of porous material 15A, 15B along the cut line 35 so that the sheets of porous material 15A, 15B will have a geometries similar to or identical to that of the stacked layers of armor material 10A-10C. This cutting of the porous sheets of material 15A, 15B may occur prior to applying them on to the stacked layers of armor material 10A-10C.

Referring now again to FIGS. 3A-3B, like FIG. 1D, the adhesive layers 11A, 11B of FIG. 3A may be applied around all exterior surfaces of the armor material 10 and mating surface of porous sheets 15 (with adhesive layers 11A1, 11B1) by a brush or it may be sprayed with a liquid sprayer as understood by one of ordinary skill in the art. After the adhesive layer 11 and porous sheets 15 are cured to the armor material 10, the protective environmental coating 12 may be applied to the exterior of porous sheet 15 by brushing, spraying, or dipping as understood by one of ordinary skill in the art. Further details and the precise sequence of steps for manufacturing the sheet system 100C of FIG. 3A will be described in more detail below in connection with the flowchart 700 of FIG. 7.

Figure 4:
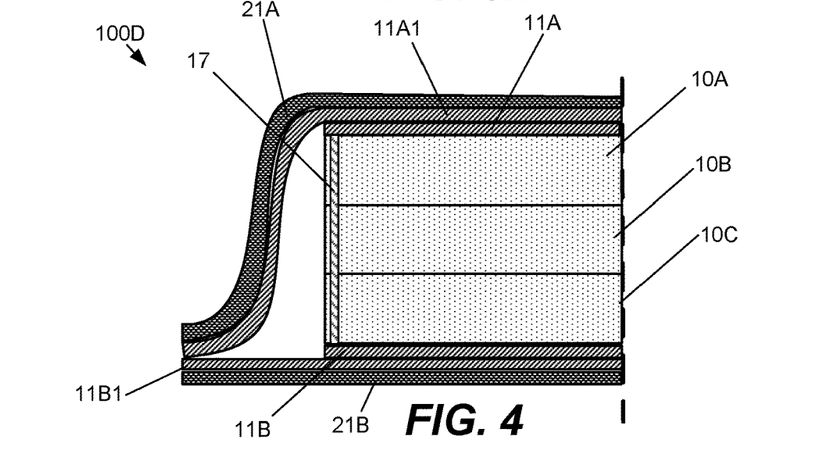
FIG. 4 another exemplary embodiment of a cross-sectional view of a hydrocarbon and water resistant armor sheet system/combination that may be used in ballistic or blast panels or human body armor applications.

Referring now to FIG. 4, this figure illustrates another exemplary embodiment of a cross-sectional view of a hydrocarbon and water resistant armor sheet system/combination 100D that may be used in human body armor applications. This cross-sectional view of FIG. 4 is very similar to the cross-sectional view of FIG. 3A. Therefore, only the differences between FIG. 4 and FIG. 3A will be described below.

In this exemplary embodiment 100D of FIG. 4, the sheets of porous material 15A, 15B have been replaced with sheets of fuel resistant and nonporous material 21A, 21B. Further, because the environmental resistive properties of the nonporous materials 21A, 21B, the protective environmental coating 12 is eliminated from this exemplary embodiment 100D.

The nonporous sheets of material 21A, 21B may comprise a film made from at least one of nylon, polyester, or a Polytetrafluoroethylene (PTFE). The nonporous material 21 will usually stop or block a fluid, like air, water, fuel, oil or other liquids from passing or penetrating through it as understood by one of ordinary skill in the art.

The nonporous material 21 may have a thickness of between about 0.0005 of an inch to about 0.020 of an inch, and preferably between about 0.001 of an inch to about 0.005 of an inch. However, other thicknesses are possible and are well within the scope of this written disclosure as understood by one of ordinary skill in the art.

The adhesive layers 11 of FIG. 4 may be applied around all exterior surfaces of the armor material 10 and fuel resistant nonporous material 21 by a brush or it may be sprayed with a liquid sprayer as understood by one of ordinary skill in the art. After the adhesive layer 11 has become tacky and coalesced to the armor material 10 and nonporous material 21A and 21B, the nonporous material 21A, 21B may be applied over the adhesive coated surfaces of the armor material 10. The sheets of nonporous material 21A, 21B are then cured to the adhesive layer 11 under heat and vacuum. Further details and the precise sequence of steps for manufacturing the sheet system 100C of FIG. 4 will be described in more detail below in connection with the flowchart 800 of FIG. 8.

Figure 5:
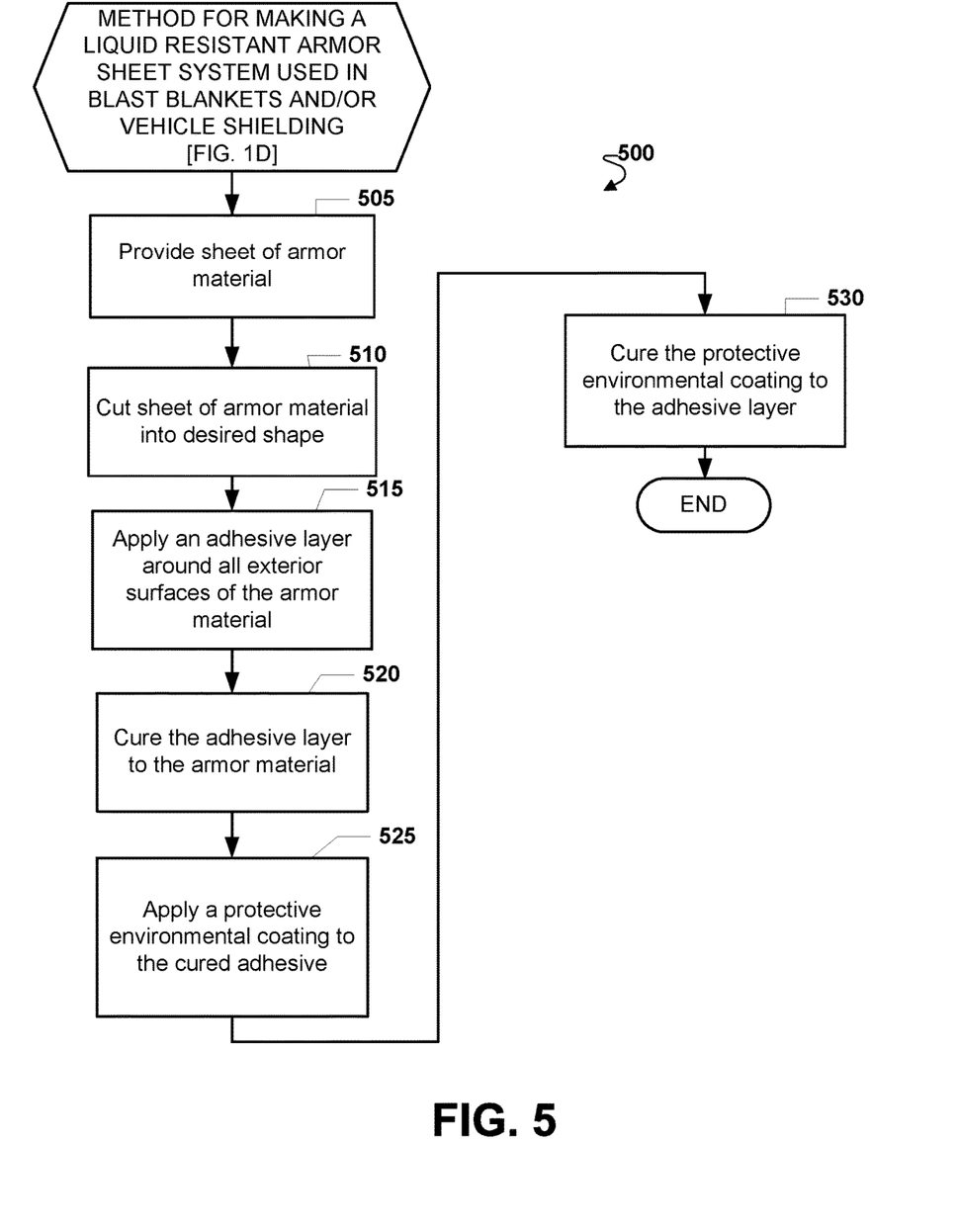
FIG. 5 is a logical flow chart illustrating one exemplary embodiment of a method for making a hydrocarbon and water resistant armor sheet system/combination as illustrated in FIG. 1D.

Referring now to FIG. 5, this figure is a logical flow chart illustrating one exemplary embodiment of a method 500 for making a hydrocarbon and water resistant armor sheet system/combination 100A as illustrated in FIG. 1D. Step 505 is the first step of method 500. In step 505, a sheet of armor material 10 may be provided such as on a roll 2 as illustrated in FIG. 1A.

Next, in step 510, the sheet of armor material 10 may be cut into a desired shape such as illustrated in FIG. 1B. In this step 510, a sheet cutting device 85 may be used to cut the sheet of armor material 10 into a desired shape or geometry such as, but not limited to, a "vest" shape for human body armor applications, a rectangular shape such as for vehicle shielding applications, or a large rectangular shape for blast blanket applications.

Subsequently, in step 515, the adhesive layer 11 as illustrated in FIG. 1D may be applied around all exterior surfaces of the armor material 10. Usually, adhesive layer 11 is applied by brushing by hand or by spraying from a spray applicator usually by hand. However, automated manufacturing techniques that employ robotics may be used for spraying and/or brushing the adhesive layer 11 on to the armor material 10 as understood by one of ordinary skill in the art.

Next, in step 520, the adhesive layer 11 may be cured to the armor material 10. In this step 520, the two layers of material 10, 11 may be placed in a convection oven (or other method of elevating surrounding temperature) and heated for about 3.0 hours at about 180.0° F. under a vacuum of no less than 22 inches of Mercury. However, depending upon the thickness of the keys of layer 11, the cure time in this step 520 may be increased or decreased depending upon the relative thickness of the adhesive layer 11. That is, if the adhesive layer 11 is thicker, then typically there will be an increase in cure time to the armor material 10.

In step 525, the protective environmental coating 12 of FIG. 1D may be applied to the cured adhesive layer 11. The protective environmental coating 12 may be applied by dipping the cured adhesive layer 11 into a pool of the environmental coating 12 or the environmental coating may be sprayed or brushed onto the adhesive layer 11. Usually, environmental coating 12 is applied by brushing by hand or by spraying from a spray applicator usually by hand. However, automated manufacturing techniques that employ robotics may be used for spraying and/or brushing the environmental coating 12 on to the cured adhesive layer 11 as understood by one of ordinary skill in the art.

Next, in step 530, the protective environmental coating 12 may be cured to the dried adhesive layer 11. In this step 530, the protective environmental coating 12 is typically allowed to cure at standard ambient temperature and pressure (SATP) for about 72.0 hours. As understood by one of ordinary skill the art, SATP usually comprises a temperature of about 25.0° C. or about 77.0° F. and an absolute pressure of about 100.0 kPa (about 1.0 bar). However, other temperatures and pressures for SATP are possible due to different climates depending upon geographical locations and are within the scope of this written disclosure. Further, longer cure times may be needed for thicker materials, while shorter cure times may be needed for thinner materials. The method 500 then ends/terminates.

Figure 6:
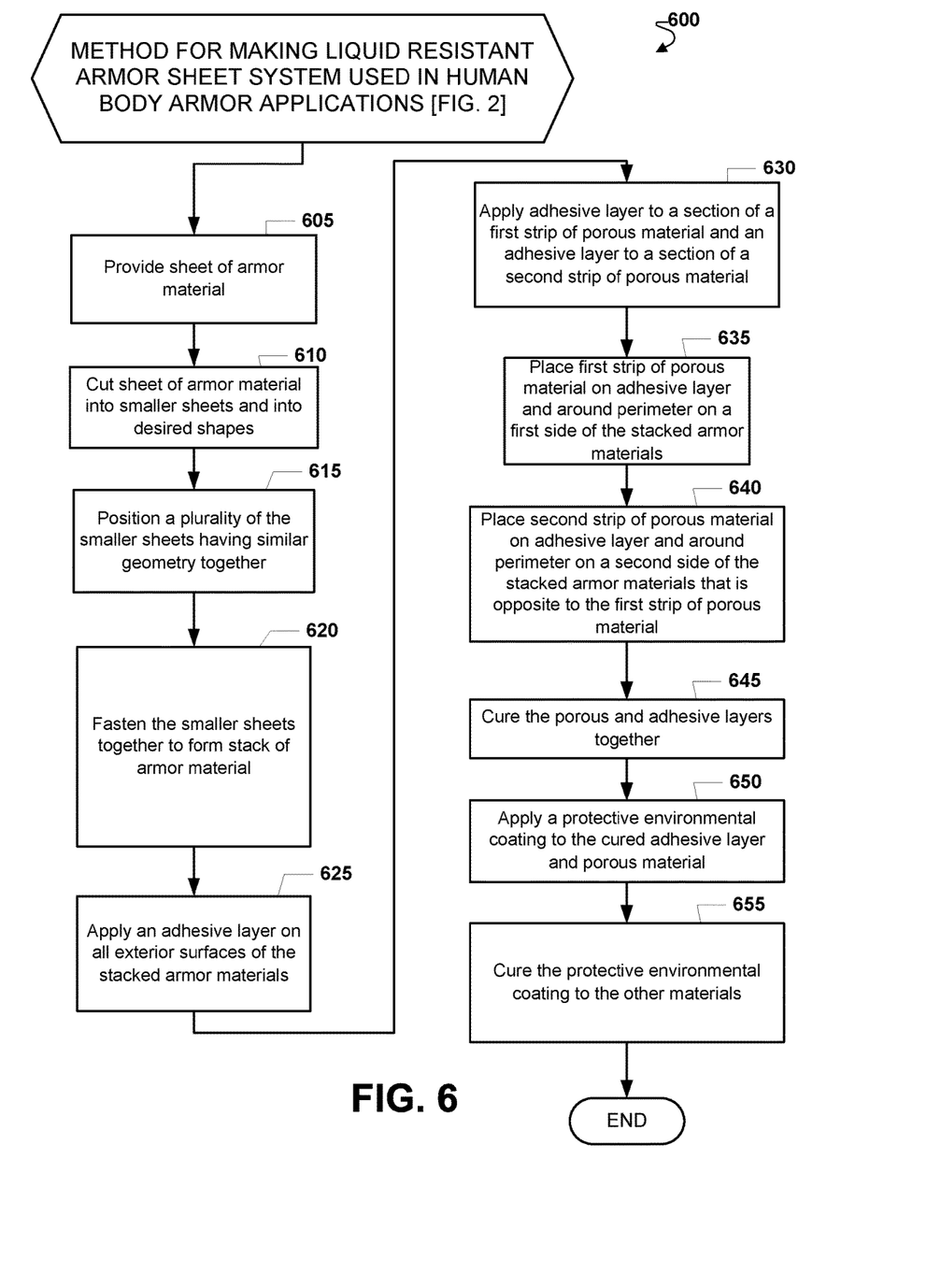
FIG. 6 is a logical flow chart illustrating one exemplary embodiment of a method for making a hydrocarbon and water resistant armor sheet system/combination as illustrated in FIG. 2.

FIG. 6 is a logical flow chart illustrating one exemplary embodiment of a method 600 for making a hydrocarbon and water resistant armor sheet system/combination 100B as illustrated in FIG. 2A. Step 605 is the first step of method 600.

In step 605, a sheet of armor material 10 may be provided such as on a roll 2 as illustrated in FIG. 1A. Next, in step 610, the sheet of armor material 10 may be cut into a desired shape such as illustrated in FIG. 1B. In this step 610, a sheet cutting device 85 may be used to cut the sheet of armor material 10 into a desired shape or geometry such as, but not limited to, a "vest" shape for human body armor applications, a rectangular shape such as for vehicle shielding applications, or a large rectangular shape for blast blanket applications.

Next, in step 615, a plurality of smaller sheets of armor material 10 that had been cut from step 610 may be provided together and placed in an alignment such as illustrated in FIG. 1C. Subsequently, in block 620, the smaller sheets of armor material 10 are fastened together to form a stack of armor material 10. As noted above in connection with FIG. 1C, different types of fastening mechanisms 17 provided by the material fastening device 95 may be used in this step 620. According to one exemplary embodiment, the fastening mechanism 17 may comprise a stitch of thread while the material fastening device 95 may comprise a sewing machine. A cross-sectional view of the stack of armor materials 10 are illustrated in FIG. 2A.

Next, in step 625, the adhesive layer 11 as illustrated in FIG. 2A may be applied around all exterior surfaces of the stacked armor materials 10A-10C. Usually, adhesive layer 11 is applied by brushing by hand or by spraying from a spray applicator, usually by hand. However, automated manufacturing techniques which employ robotics may be used for spraying and/or brushing the adhesive layer 11 on to the armor material 10 as understood by one of ordinary skill in the art.

In step 630, a first adhesive layer 11A1 (see FIG. 2A) is applied to a section of a first perimeter strip of porous material 15A; a second adhesive layer 11B1 is applied to a section of a second perimeter strip of porous material 15B (see FIG. 2A). Next, in step 635, the first perimeter strip of porous material 15A is placed on the adhesive layer 11A and around a geometrical perimeter on a first side of the stack of armor materials 10A-10C (See FIG. 2B).

In step 640, the second perimeter strip 15B of porous material is placed the adhesive layer 11B (See FIG. 2A) and around a geometrical perimeter of a second side of the stacked armor materials 10A-10C that is opposite relative to the first perimeter strip 15A of porous material (See also FIG. 2B). In step 645, the strips of porous materials 15A, 15B and the adhesive layers 11 are cured together. In this step 645, the layers are usually cured together by heating the materials at about 180.0° F. for approximately 3.0 hours and under a vacuum at about 22.0 inches of mercury. However, other curing times, temperatures and a vacuum may be employed without departing from the scope of this written disclosure. Longer cure times and higher temperatures may be needed for thicker materials, while shorter cure times and lower temperatures may be used for thinner materials as understood by one of ordinary skill in the art.

In step 650, the protective environmental coating 12 of FIG. 2A may be applied to the cured porous material 15 and adhesive layer 11. The protective environmental coating 12 may be applied by dipping the cured porous material 15 and adhesive layer 11 into a pool/bath/flow of the environmental coating 12 or the environmental coating 12 may be sprayed or brushed onto the porous material 15 and adhesive layer 11. Usually, environmental coating 12 is applied by hand brushing or by hand spraying from a spray applicator usually by hand. However, automated manufacturing techniques which employ robotics may be used for spraying and/or brushing the environmental coating 12 on to the cured porous material and adhesive layer 11 as understood by one of ordinary skill in the art.

Next, in step 655, the protective environmental coating 12 may be cured to the porous material and dried adhesive layer 11. In this step 655, the protective environmental coating 12 is typically allowed to cure at standard ambient temperature and pressure (SATP) for about 72.0 hours. As understood by one of ordinary skill the art, SATP usually comprises a temperature of about 25.0° C. or about 77.0° F. and an absolute pressure of about 100.0 kPa (about 1.0 bar). However, other temperatures and pressures for SATP are possible due to different climates depending upon geographical locations and are within the scope of this written disclosure. Further, longer cure times may be needed for thicker materials, while shorter cure times may be needed for thinner materials. The method 600 then ends/terminates.

Figure 7:
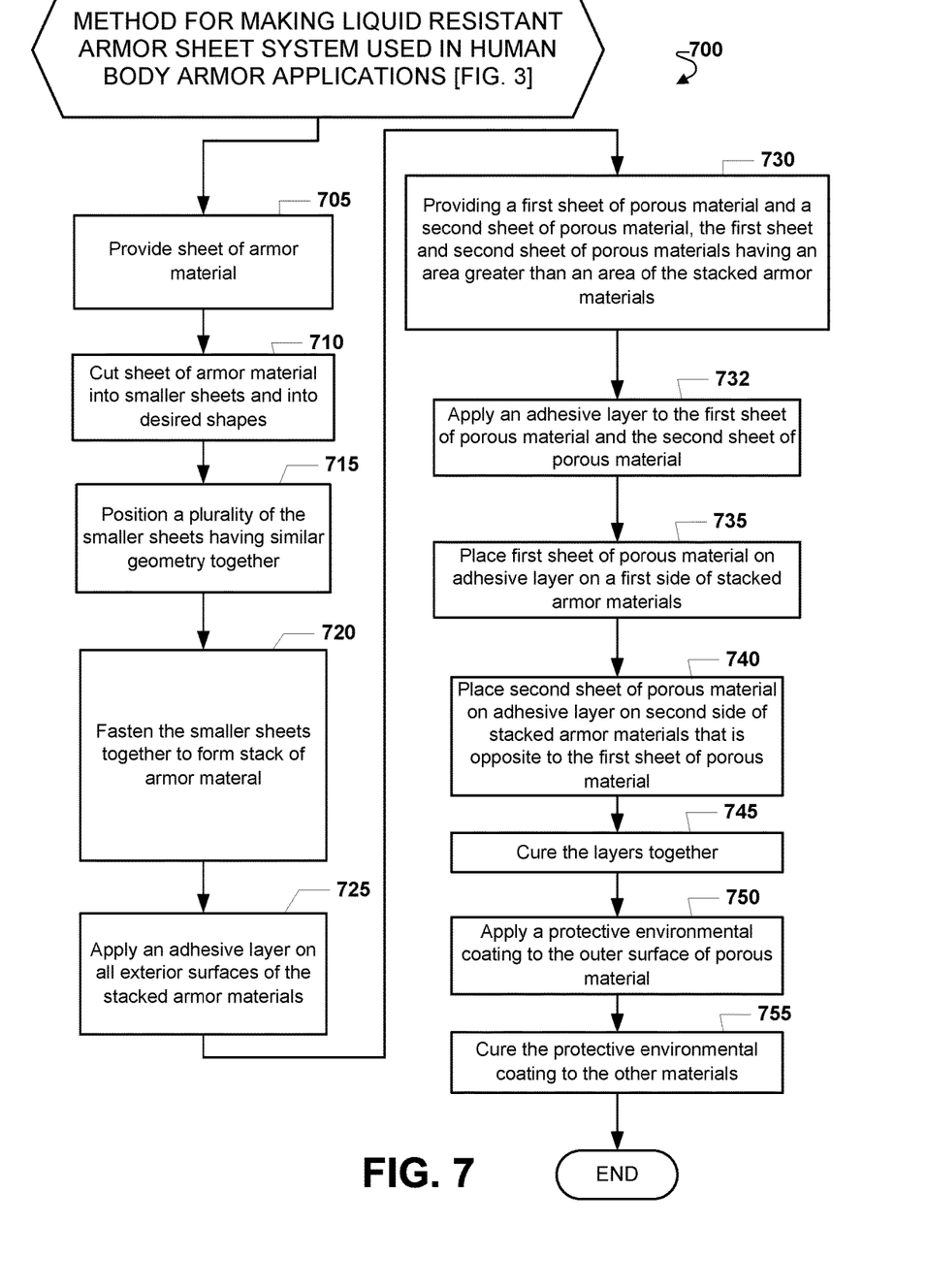
FIG. 7 is a logical flow chart illustrating one exemplary embodiment of a method for making a hydrocarbon and water resistant armor sheet system/combination as illustrated in FIG. 3.

FIG. 7 is a logical flow chart illustrating one exemplary embodiment of a method 700 for making a hydrocarbon and water resistant armor sheet system/combination 100C as illustrated in FIG. 3A. Step 705 is the first step of method 700.

In step 705, a sheet of armor material 10 may be provided such as on a roll 2 as illustrated in FIG. 1A. Next, in step 710, the sheet of armor material 10 may be cut into a desired shape such as illustrated in FIG. 1B. In this step 710, a sheet cutting device 85 may be used to cut the sheet of armor material 10 into a desired shape or geometry such as, but not limited to, a "vest" shape for human body armor applications, a rectangular shape such as for vehicle shielding applications, or a large rectangular shape for blast blanket applications.

Next, in step 715, a plurality of smaller sheets of armor material 10 that had been cut from step 710 may be provided together and placed in an alignment such as illustrated in FIG. 1C. Subsequently, in block 720, the smaller sheets of armor material 10 are fastened together to form a stack of armor material 10. As noted above in connection with FIG. 1C, different types of fastening mechanisms 17 provided by the material fastening device 95 may be used in this step 720. According to one exemplary embodiment, the fastening mechanism 17 may comprise a stitch of thread while the material fastening device 95 may comprise a sewing machine. A cross-sectional view of the stack of armor materials 10 are illustrated in FIG. 2A.

Next, in step 725, the adhesive layer 11 as illustrated in FIG. 3A may be applied around all exterior surfaces of the stacked armor material 10A-10C and mating surface of porous sheets 15. Usually, adhesive layer 11 is applied by brushing by hand or by spraying from a spray applicator usually by hand. However, automated manufacturing techniques which employ robotics may be used for spraying and/or brushing the adhesive layer 11 on to the armor material 10 as understood by one of ordinary skill in the art.

In step 730, a first sheet and second sheet of porous materials 15A, 15B may be provided/supplied. The first sheet 15A and second sheet 15B of porous materials each have a surface area greater than a surface area of the stacked armor materials 10A-10C. In step 732, adhesive layers 11A1, 11B1 of FIG. 3A may be applied to one face of the first and second sheets of porous materials 15A, 15B.

Next, in step 735, the first sheet of porous material 15A (and its adhesive layer 11A1) is placed on the adhesive layer 11A on a first side of the stack of armor materials 10A-10C (See FIG. 3B).

In step 740, the second sheet 15B of porous material (and its adhesive layer 11B1) is placed on the adhesive layer 11B (See FIG. 3A) of a second side of the stacked armor materials 10A-10C that is opposite relative to the first sheet 15A of porous material (See also FIG. 3B). In step 745, the sheets of porous materials 15A, 15B and the adhesive layers 11 are cured together. In this step 745, the layers are usually cured together by heating the materials at about 180.0° F. for about 3.0 hours and under a vacuum at about 22 inches of mercury. However, other cure times, temperatures and vacuum may be employed without departing from the scope of this written disclosure. Longer cure times and higher temperatures may be needed for thicker materials, while shorter cure times and lower temperatures may be used for thinner materials as understood by one of ordinary skill in the art.

In step 750, the protective environmental coating 12 of FIG. 3A may be applied to the cured porous material 15. The protective environmental coating 12 may be applied by dipping the porous material 15 into a pool/bath/flow of the environmental coating 12 or the environmental coating 12 may be sprayed or brushed onto the porous material 15. Usually, environmental coating 12 is applied by hand brushing or by hand spraying from a spray applicator usually by hand. However, automated manufacturing techniques which employ robotics may be used for spraying and/or brushing the environmental coating 12 on to the porous material 15 as understood by one of ordinary skill in the art.

Next, in step 755, the protective environmental coating 12 may be cured to the dried porous material layer 15. In this step 755, the protective environmental coating 12 is usually allowed to cure at standard ambient temperature and pressure (SATP) for about 72.0 hours. As understood by one of ordinary skill the art, SATP usually comprises a temperature of about 25.0° C. or about 77.0° F. and an absolute pressure of about 100.0 kPa (about 1.0 bar). However, other temperatures and pressures for SATP are possible due to different climates depending upon geographical locations and are within the scope of this written disclosure. Further, longer cure times may be needed for thicker materials, while shorter cure times may be needed for thinner materials. The method 700 then ends/terminates.

Figure 8:
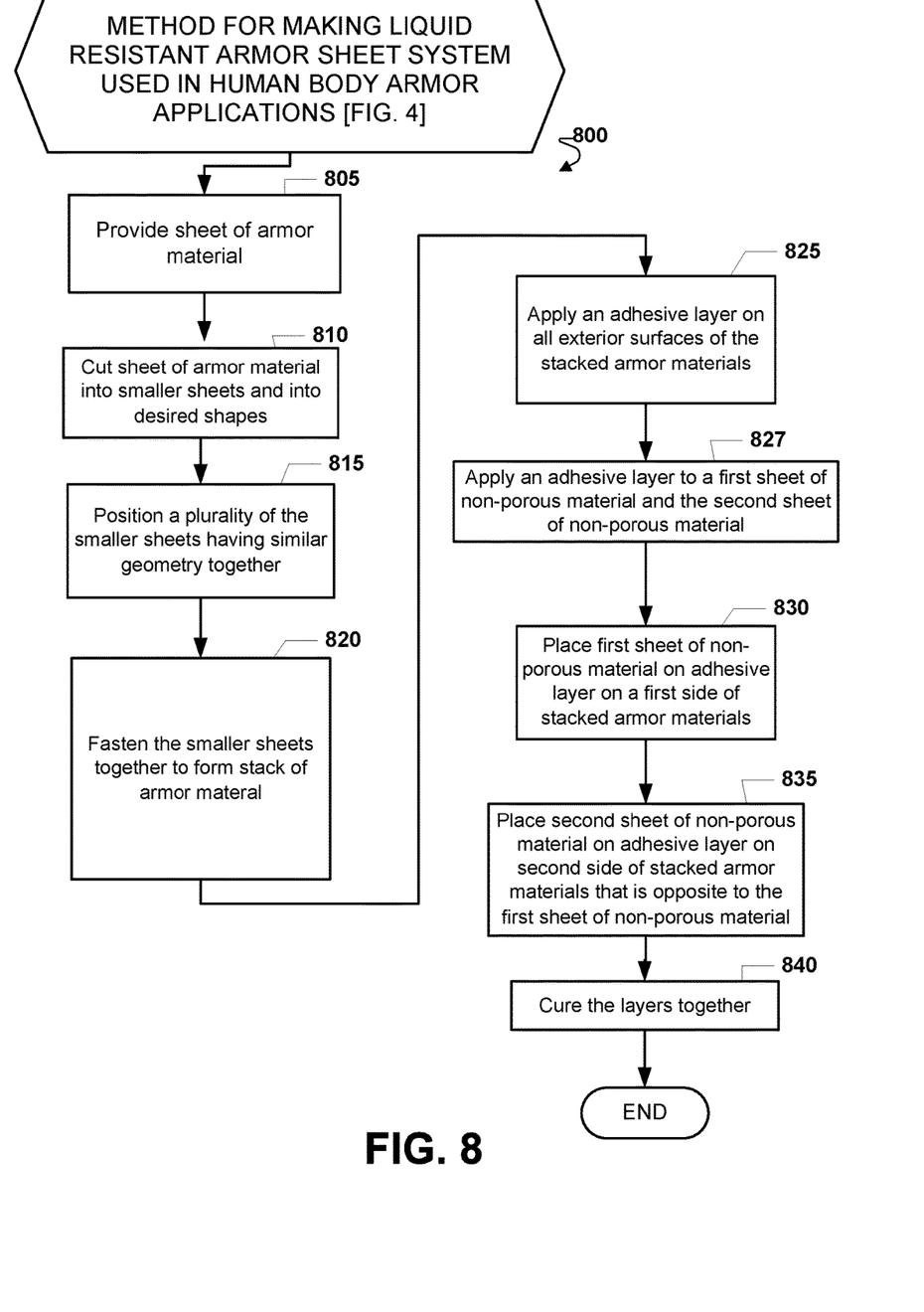
FIG. 8 is a logical flow chart illustrating one exemplary embodiment of a method for making a hydrocarbon and water resistant armor sheet system/combination as illustrated in FIG. 4.

FIG. 8 is a logical flow chart illustrating one exemplary embodiment of a method 800 for making a hydrocarbon and water resistant armor sheet system/combination 100D as illustrated in FIG. 4. Step 805 is the first step of method 800.

In step 805, a sheet of armor material 10 may be provided such as on a roll 2 as illustrated in FIG. 1A. Next, in step 810, the sheet of armor material 10 may be cut into a desired shape such as illustrated in FIG. 1B. In this step 810, a sheet cutting device 85 may be used to cut the sheet of armor material 10 into a desired shape or geometry such as, but not limited to, a "vest" shape for human body armor applications, a rectangular shape such as for vehicle shielding applications, or a large rectangular shape for blast blanket applications.

Next, in step 815, a plurality of smaller sheets of armor material 10 having similar geometries that had been cut from step 810 may be provided together and placed in an alignment such as illustrated in FIG. 1C. Subsequently, in block 820, the smaller sheets of armor material 10A-10C are fastened together to form a stack of armor materials 10A-10C. As noted above in connection with FIG. 1C, different types of fastening mechanisms 17 provided by the material fastening device 95 may be used in this step 820. According to one exemplary embodiment, the fastening mechanism 17 may comprise a stitch of thread while the material fastening device 95 may comprise a sewing machine. A cross-sectional view of the stack of armor materials 10A-10C are illustrated in FIG. 4.

Next, in step 825, the adhesive layers 11A, 11B as illustrated in FIG. 4 may be applied around all exterior surfaces of the stacked armor materials 10A-10C. Usually, adhesive layers 11A, 11B are applied by brushing by hand or by spraying from a spray applicator usually by hand. However, automated manufacturing techniques which employ robotics may be used for spraying and/or brushing the adhesive layer 11 on to the armor material 10 as understood by one of ordinary skill in the art.

In step 827, a first sheet and a second sheet of nonporous materials 21A, 21B may be provided/supplied. The first sheet of nonporous material 21A and the second sheet of nonporous material 21B each has an area greater than an area of the stack of armor materials. Adhesive layers 11A1, 11B1 of FIG. 4 may be applied to the sheets of nonporous material 21A, 21B. Next, in step 830, the first sheet of nonporous material 21A (with its adhesive layer 11A1) is applied to the adhesive layer 11A which is on a first side of the stack of armor materials 10A-10C.

The first sheet of nonporous material 21A (with its adhesive layer 11A1) may be applied to the adhesive layer 11A similar to how the porous sheets 15 are applied as is illustrated in FIG. 3B. Next, in step 835, the second sheet of nonporous material 21B (with its adhesive layer 11B1) may be placed on the adhesive layer 11B which is on the second side of the stacked armor materials 10A-10C and which is opposite to the first sheet of nonporous material 21A. This sheet of nonporous material 21B may also be applied similar to how the porous sheets 15 of FIG. 3B are applied.

In step 840, the sheets of nonporous materials 21A-21B and the adhesive layers 11 are cured together. In this step 840, the layers are usually cured together by heating the materials to about 180.0° F. for about 3.0 hours and under a vacuum at about 22.0 inches of mercury using an out-of-autoclave method. This method utilizes a convection oven with heat resistant vacuum lines that connect to an external vacuum pump.

The combination of materials and method described above provides an improved armor composite that is resistant to penetration and impact and which does not degrade in the presence of hydrocarbons and/or water. The improved armor composite does not detract from the impact and penetration properties of the base armor material, such as an aramid material, which is coated with the layers of other materials described above. Specifically, for the embodiments described above which use the protective environmental coating 12 or the fuel resistant and nonporous film 21, the coating 12 or film 21 will usually provide at least about 30 days of fuel and/or water resistance for the base armor material that is encapsulated/covered by the protective environmental coating 12 for film 21.

Specifically, the following constructions will provide a minimum of 30 days of fuel or water resistance based on soak testing:

FIG. 1D is a system produced by applying the adhesive 11 preferably at a thickness of about 0.002 of an inch to armor material 10. Once the adhesive has dried, the environmental protective coating 12 may have a thickness preferably between about 0.004 of an inch to about 0.007 of an inch.

FIG. 2A is a system produced by applying the adhesive 11 preferably at a thickness of about 0.002 of an inch to the armor material 10 and porous material 15 for a total thickness of 0.004 of an inch. Once the adhesive has dried, the porous material is applied and then cured, followed by the application of the environmental protective coating 12, which may have a thickness preferably between about 0.004 of an inch to about 0.007 of an inch.

FIG. 3A is a system produced by applying the adhesive 11 preferably at a thickness of about 0.002 of an inch to the armor material 10 and porous material 15 for a total thickness of 0.004 of an inch. Once the adhesive has dried, the porous material is applied and then cured, followed by the application of the environmental protective coating 12, which may have a thickness preferably between about 0.004 of an inch to about 0.007 of an inch.

FIG. 4 is a system produced by applying the adhesive 11 preferably at a thickness of about 0.002 of an inch to the armor material 10 and fuel resistant and nonporous film 21 for a total thickness of 0.004 of an inch. Once the adhesive has dried, the fuel resistant and nonporous film material 21 which has a thickness of about 0.002 of an inch is applied and then cured.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or in parallel (substantially simultaneously) with other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Although a few embodiments have been described in detail above, those skilled in the art will readily appreciate that many modifications are possible in the embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, sixth paragraph for any limitations of any of the claims herein, except for those in which the claim expressly uses the words 'means for' together with an associated function.

Therefore, although selected aspects have been illustrated and described in detail, it will be understood that various substitutions and alterations may be made therein without departing from the spirit and scope of the present invention, as defined by the following claims.

What is claimed is:

1. A method for making a liquid-resistant armor composite comprising:
    applying first and second adhesive layers to upper and lower surfaces of a stack of armor materials;
    providing a first sheet and a second sheet of porous materials, the first sheet of porous material and the second sheet of porous material each having an area greater than an area of the stack of armor materials;
    applying a third adhesive layer to the first sheet of porous material;
    applying a fourth adhesive layer to the second sheet of porous material
    placing the first sheet of porous material on the first adhesive layer of a first side of the stack of armor materials;
    placing the second sheet of porous material on the second adhesive layer of a second side of the stack of armor materials;
    applying heat to the adhesive layer, first and second sheets of porous materials, and the stack of armor materials;
    applying a protective environmental coating to the sheets of porous materials; and
    curing the protective environmental coating to the sheets of porous materials, wherein the protective environmental coating comprises a solvated fluorinated elastomer.

2. The method of claim 1, wherein the armor material comprises an aramid material.

3. The method of claim 1, wherein the sheets of porous material comprise a fabric made from at least one of nylon, polyester, polypropylene, polyethylene and an aramid.

4. The method of claim 1, wherein the adhesive layer comprises a polyurethane layer.

5. The method of claim 1, wherein the liquid-resistant armor composite forms part of at least one of ballistic apparel, a blast blanket, a ballistic panel, and a fragmentation panel.

6. The method of claim 5, wherein the ballistic apparel comprises a bullet-proof vest.

7. The method of claim 1, wherein the adhesive layer is applied by at least one of brushing and spraying.

8. The method of claim 1, wherein the adhesive layer is applied such that the adhesive layer has a thickness between about 0.002 of an inch to about 0.010 of an inch.

9. The method of claim 1, wherein the sheets of porous materials fabric aerial density of between about 1.0 oz per square yard to about 21.0 oz per square yard.

10. A method for making a liquid-resistant armor composite comprising:
    applying first and second adhesive layers to upper and lower surfaces of a stack of armor materials;
    providing a first sheet and a second sheet of porous materials, the first sheet of porous material and the second sheet of porous material each having an area greater than an area of the stack of armor materials;
    applying a third adhesive layer to the first sheet of porous material;
    applying a fourth adhesive layer to the second sheet of porous material
    placing the first sheet of porous material on the first adhesive layer of a first side of the stack of armor materials;
    placing the second sheet of porous material on the second adhesive layer of a second side of the stack of armor materials;
    applying heat to the adhesive layer, first and second sheets of porous materials, and the stack of armor materials;
    applying a protective environmental coating to the sheets of porous materials; and
    curing the protective environmental coating to the sheets of porous materials, wherein the protective environmental coating comprises a solvated fluorinated elastomer, wherein the environmental coating makes the liquid-resistant armor impervious to at least one of fuel, oil, air, and water.

11. The method of claim 10, wherein the armor material comprises an aramid material.

12. The method of claim 10, wherein the sheets of porous material comprise a fabric made from at least one of nylon, polyester, polypropylene, polyethylene and an aramid.

13. The method of claim 10, wherein the adhesive layer comprises a polyurethane layer.

14. The method of claim 10, wherein the liquid-resistant armor composite forms part of at least one of ballistic apparel, a blast blanket, a ballistic panel, and a fragmentation panel.

15. The method of claim 14, wherein the ballistic apparel comprises a bullet-proof vest.

16. The method of claim 10, wherein the adhesive layer is applied by at least one of brushing and spraying.

17. The method of claim 16, wherein the adhesive layer is applied such that the adhesive layer has a thickness between about 0.002 of an inch to about 0.010 of an inch.

18. The method of claim 17, wherein the sheets of porous materials fabric aerial density of between about 1.0 oz per square yard to about 21.0 oz per square yard.

19. The method of claim 18, wherein the liquid-resistant armor composite forms part of at least one of ballistic apparel, a blast blanket, a ballistic panel, and a fragmentation panel.

20. The method of claim 19, wherein the ballistic apparel comprises a bullet-proof vest.

\* \* \* \* \*